US012780681B2

(12) United States Patent
Sakatsume et al.

(10) Patent No.: US 12,780,681 B2
(45) Date of Patent: Nov. 3, 2026

(54) POSITIVE ELECTRODE ACTIVE MATERIAL FOR USE IN SECONDARY BATTERIES AND METHOD FOR PRODUCTION THEREOF

(71) Applicants: HONDA MOTOR CO., LTD., Tokyo (JP); NATIONAL INSTITUTE OF ADVANCED INDUSTRIAL SCIENCE AND TECHNOLOGY, Tokyo (JP)

(72) Inventors: Kazumasa Sakatsume, Saitama (JP); Yoshiyuki Morita, Saitama (JP); Yoshiya Fujiwara, Saitama (JP); Akihisa Tanaka, Saitama (JP); Kazuki Chiba, Saitama (JP); Takashi Hakari, Saitama (JP); Junji Akimoto, Ibaraki (JP); Kunimitsu Kataoka, Ibaraki (JP)

(73) Assignees: HONDA MOTOR CO., LTD, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 402 days.

(21) Appl. No.: 18/595,444

(22) Filed: Mar. 5, 2024

(65) Prior Publication Data

US 2024/0327237 A1 Oct. 3, 2024

(30) Foreign Application Priority Data

Mar. 30, 2023 (JP) ................................ 2023-055132

(51) Int. Cl.
*C01G 45/12* (2025.01)
*H01M 4/505* (2010.01)

(52) U.S. Cl.
CPC ............ *C01G 45/12* (2013.01); *H01M 4/505* (2013.01); *C01P 2002/72* (2013.01); *C01P 2006/40* (2013.01)

(58) Field of Classification Search
CPC ...... C01G 45/12; H01M 4/505; H01M 4/485; H01M 4/0471; C01P 2002/72; C01P 2006/40; Y02E 60/10
See application file for complete search history.

(56) References Cited

U.S. PATENT DOCUMENTS

2019/0020021 A1* 1/2019 Yabuuchi ............ C01G 23/005

FOREIGN PATENT DOCUMENTS

CN 110372039 A 10/2019
JP 2005263583 A 9/2005
(Continued)

OTHER PUBLICATIONS

Notification of Reasons for Refusal issued Jun. 23, 2026 in the JP Patent Application No. 2023-055132.

*Primary Examiner* — Daniel C. McCracken
(74) *Attorney, Agent, or Firm* — CKC & PARTNERS CO., LLC

(57) ABSTRACT

The invention provides a secondary battery positive electrode active material including an oxide containing Li, Mn, and Ti, wherein the oxide has a Li content of 43 to 60 mol %, a Mn content of 22 to 35 mol %, and a Ti content of 7 to 29 mol %, the oxide has an X-ray diffraction pattern that is measured using CuKα as an X-ray source and has a maximum X-ray diffraction peak exhibiting the highest peak intensity and existing at an angle in the range of 43 to 45 degrees, the oxide satisfies the formula $0.70<a/(a+b)<0.90$, wherein a is the intensity of the maximum X-ray diffraction peak and b is the intensity of a maximum peak among X-ray diffraction peaks in the 2θ range of 15 to 22 degrees, and the oxide has a lattice constant of 4.10 to 4.14 Å.

6 Claims, 6 Drawing Sheets

(56) References Cited

FOREIGN PATENT DOCUMENTS

| | | | |
|---|---|---|---|
| JP | 2005268127 | A | 9/2005 |
| JP | 2012041257 | A | 3/2012 |
| JP | 2012096974 | A | 5/2012 |
| JP | 2016122549 | A | 7/2016 |
| WO | 2017122663 | A1 | 7/2017 |
| WO | 2019087717 | A1 | 5/2019 |

* cited by examiner

POSITIVE ELECTRODE ACTIVE MATERIAL FOR USE IN SECONDARY BATTERIES AND METHOD FOR PRODUCTION THEREOF

This application is based on and claims the benefit of priority from Japanese Patent Application No. 2023-055132, filed on 30 Mar. 2023, the content of which is incorporated herein by reference.

BACKGROUND OF THE INVENTION

Field of the Invention

The present invention relates to a positive electrode active material for use in secondary batteries and relates to a method for producing the positive electrode active material.

Related Art

In recent years, positive electrode active materials for secondary batteries that contribute to energy efficiency have been researched and developed to ensure that more people have access to affordable, reliable, sustainable, and advanced energy. Known positive electrode active materials for secondary batteries include LiMnTi-containing oxides, which are oxides containing lithium, manganese, and titanium and having a rock salt type structure (see Patent Documents 1 to 3).

Patent Document 1: Japanese Unexamined Patent Application, Publication No. 2012-96974

Patent Document 2: PCT International Publication No. WO2017/122663

Patent Document 3: PCT International Publication No. WO2019/087717

SUMMARY OF THE INVENTION

Meanwhile, positive electrode active materials for secondary batteries should have high charge-discharge capacity and high charge-discharge efficiency and should ensure stable charge and discharge during charge-discharge cycles. The inventors' study has revealed that unfortunately, the conventional LiMnTi-containing oxide with a rock salt type structure tends to provide a charge-discharge curve having an inflection point and being variable in shape during charge-discharge cycles. The capacity of secondary batteries is estimated based on their charge-discharge curve. Thus, if the charge-discharge curve of a secondary battery is variable in shape, it may be impossible to correctly estimate its capacity. Therefore, positive electrode active materials for secondary batteries should provide a charge-discharge curve with a highly stable shape during charge-discharge cycles.

It is an object of the present invention, which has been made in view of the circumstances described above, to provide a secondary battery positive electrode active material that has a high charge-discharge capacity and a high charge-discharge efficiency and provides a charge-discharge curve with a highly stable shape during charge-discharge cycles and to provide a method for producing such an active material.

The inventors have completed the present invention based on findings that controlling the contents of lithium, manganese, and titanium in a LiMnTi-containing oxide, controlling the intensity ratio between specific X-ray diffraction peaks in the X-ray diffraction pattern of the LiMnTi-containing oxide, and controlling the lattice constant of the LiMnTi-containing oxide are effective in solving the problem described above. Specifically, the present invention provides the following aspects.

(1) A secondary battery positive electrode active material including an oxide containing lithium, manganese, and titanium, the oxide having a lithium content in the range of 43 to 60 mol %, a manganese content in the range of 22 to 35 mol %, and a titanium content in the range of 7 to 29 mol % based on the total content of lithium, manganese, and titanium normalized to 100 mol %, the oxide having an X-ray diffraction pattern that is measured using CuKα as an X-ray source and has a maximum X-ray diffraction peak exhibiting a highest peak intensity in the 2θ range of 5 to 90 degrees and existing at an angle in the range of 43 to 45 degrees, the oxide satisfying the formula $0.70<a/(a+b)<0.90$, wherein a is the intensity of the maximum X-ray diffraction peak and b is the intensity of a maximum peak among X-ray diffraction peaks in the 2θ range of 15 to 22 degrees, the oxide having a lattice constant in the range of 4.10 to 4.14 Å.

The secondary battery positive electrode active material according to aspect (1), which has lithium, manganese, and titanium contents, a/(a+b), and a lattice constant within the specified ranges, provides improved charge-discharge capacity, improved charge-discharge efficiency, and improved stability of charge-discharge curve shape during charge-discharge cycles with a good balance between them.

(2) The secondary battery positive electrode active material according to aspect (1), wherein the oxide has a lithium content in the range of 45 to 58 mol %, a manganese content in the range of 24 to 33 mol %, a titanium content in the range of 9 to 27 mol %, and the a/(a+b) satisfies the formula:

$$0.78\leq a/(a+b)\leq 0.86.$$

The secondary battery positive electrode active material according to aspect (2), which has lithium, manganese, and titanium contents and a/(a+b) within the specified ranges, provides improved charge-discharge capacity, improved charge-discharge efficiency, and improved stability of charge-discharge curve shape during charge-discharge cycles with a better balance between them.

(3) A method for producing the secondary battery positive electrode active material according to aspect (1) or (2), the method including: subjecting a NaMnTi-containing oxide containing sodium, manganese, and titanium to hydrothermal treatment in a lithium aqueous solution.

The secondary battery positive electrode active material production method according to aspect (3), which includes subjecting a NaMnTi-containing oxide to hydrothermal treatment in a lithium aqueous solution, is advantageous in the industrial production of the secondary battery positive electrode active material.

(4) The method according to aspect (3), wherein the NaMnTi-containing oxide has a sodium content in the range of 0.40 to 0.60 moles and a titanium content in the range of 0.20 to 0.50 moles based on the total molar amount of the manganese and the titanium normalized to 1 mole.

The secondary battery positive electrode active material production method according to aspect (4), in which the NaMnTi-containing oxide has sodium, manganese, and titanium contents within the specified ranges, can reliably produce the secondary battery positive electrode active material defined above.

(5) The method according to aspect (3) or (4), wherein the NaMnTi-containing oxide has a tunnel structure.

The secondary battery positive electrode active material production method according to aspect (5), in which the NaMnTi-containing oxide has a tunnel structure, can more reliably produce the secondary battery positive electrode active material defined above.

(6) The method according to any one of aspects (3) to (5), wherein the lithium aqueous solution has a lithium content in the range of 2.0 to 30.0 moles based on the total molar amount of the manganese and the titanium normalized to 1 mole in the NaMnTi-containing oxide in the lithium aqueous solution.

The secondary battery positive electrode active material production method according to aspect (6), in which the lithium aqueous solution has a lithium content in the specified range, can more reliably produce the secondary battery positive electrode active material defined above.

The present invention provides a secondary battery positive electrode active material that has a high charge-discharge capacity and a high charge-discharge efficiency and provides a charge-discharge curve with a highly stable shape during charge-discharge cycles. The present invention also provides a method for producing such an active material.

DETAILED DESCRIPTION OF THE INVENTION

Figure 1:
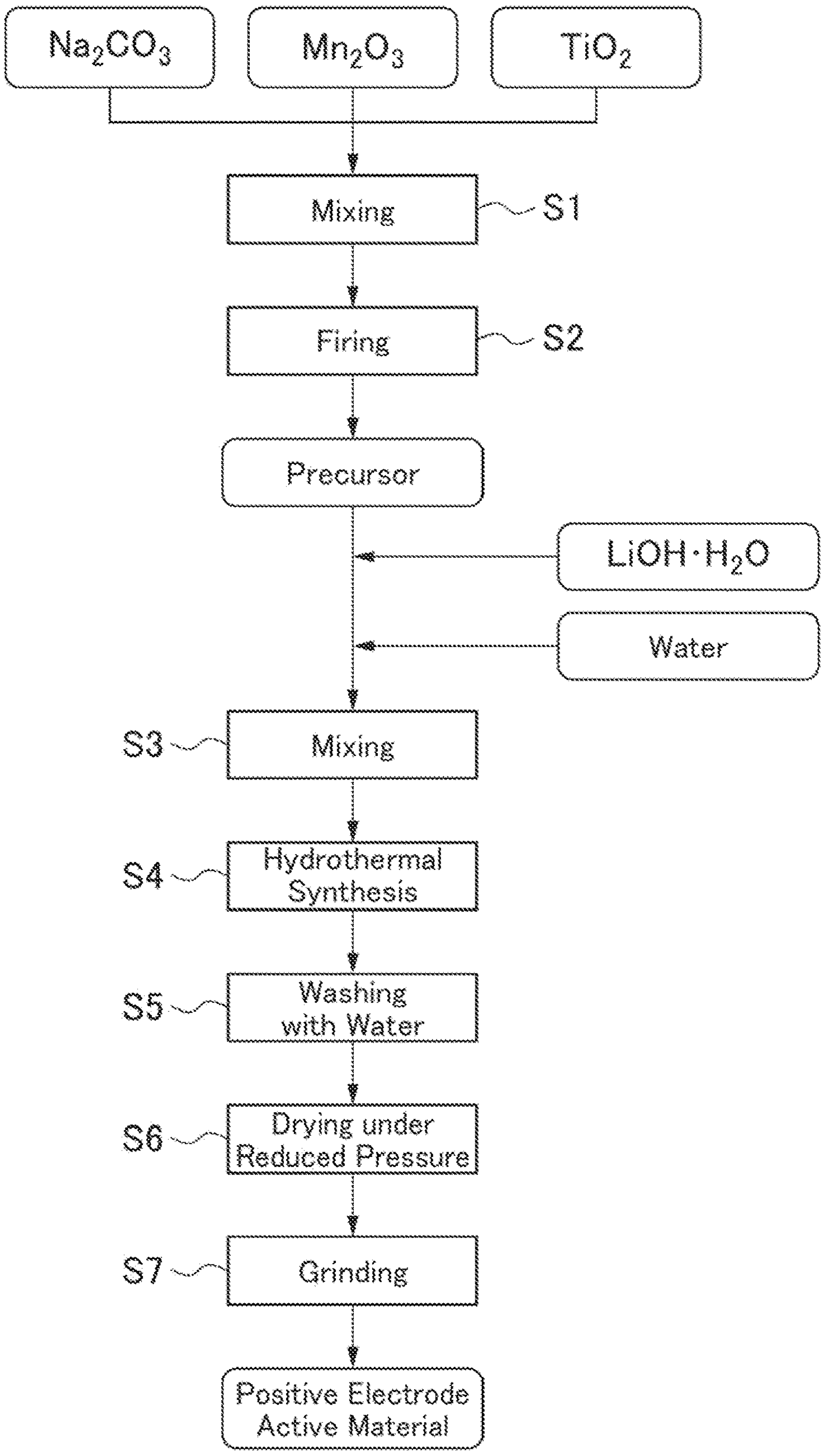
FIG. 1 is a flow chart showing a method for producing a secondary battery positive electrode active material according to an embodiment of the present invention.

Hereinafter, embodiments of the present invention will be described. It should be noted that the embodiments described below are only by way of example and are not intended to limit the present invention.

The secondary battery positive electrode active material according to an embodiment of the present invention is a LiMnTi-containing oxide, which contains lithium, manganese and titanium. The LiMnTi-containing oxide has a lithium content in the range of 43 to 60 mol %, a manganese content in the range of 22 to 35 mol %, and a titanium content in the range of 7 to 29 mol % based on the total content of lithium, manganese, and titanium normalized to 100 mol %. A lithium content of 43 mol % or more contributes to improved charge-discharge capacity. A lithium content of 60 mol % or less contributes to improved charge-discharge efficiency. A manganese content of 35 mol % or less and a titanium content of 9 mol % or more contribute to improved stability of charge-discharge curve shape during charge-discharge cycles. A manganese content of 22 mol % or more and a titanium content of 29 mol % or less contribute to improved charge-discharge capacity and improved cycle characteristics. In an embodiment of the present invention, therefore, the lithium, manganese, and titanium contents are set within the specified ranges. The lithium content may be in the range of 45 to 58 mol %, the manganese content in the range of 24 to 33 mol %, and the titanium content in the range of 9 to 27 mol %.

Regarding the lithium, manganese, and titanium contents of the LiMnTi-containing oxide, the lithium content and the titanium content may be in the range of 0.80 to 1.40 moles and in the range of 0.20 to 0.50 moles, respectively, based on the total molar amount of manganese and titanium normalized to 1 mole. The lithium content may also be in the range of 0.80 to 1.35 moles, and the titanium content may also be in the range of 0.22 to 0.49 moles.

The LiMnTi-containing oxide may contain any other additional metal(s) in addition to lithium, manganese, and titanium. The content of such an additional metal(s) may be in the range of 0.00 to 1.00 mol % based on the total content of lithium, manganese, and titanium normalized to 100 mol %. The LiMnTi-containing oxide may contain sodium. The sodium content may be in the range of 0.00 to 1.00 mol %.

As measured using CuKα as an X-ray source, the LiMnTi-containing oxide has an X-ray diffraction pattern that has a maximum X-ray diffraction peak exhibiting the highest peak intensity in the 20 range of 5 to 90 degrees and existing at an angle in the range of 43 to 45 degrees. The X-ray diffraction peak in the 20 range of 43 to 45 degrees corresponds to the maximum X-ray diffraction peak of a LiMnTi-containing oxide with a rock salt type structure. This means that the LiMnTi-containing oxide includes a LiMnTi-containing oxide with a rock salt type structure as a main component.

The LiMnTi-containing oxide satisfies the formula $0.70<a/(a+b)<0.90$ in which a is the intensity of the maximum X-ray diffraction peak defined above, and b is the intensity of a maximum peak among the X-ray diffraction peaks in the 20 range of 15 to 22 degrees.

The X-ray diffraction peaks in the 20 range of 15 to 22 degrees correspond to X-ray diffraction peaks of LiMnTi-containing oxides with structures other than the rock salt type structure. Such structures other than the rock salt type structure include, for example, a Li excess layered structure, a layered rock salt type structure, a spinel type structure, and a tunnel structure. The ratio a/(a+b) is an indicator of the content of the rock salt type structure in the LiMnTi-containing oxide.

A LiMnTi-containing oxide with too high a content of a Li excess layered structure may cause a decrease in the voltage of the charge-discharge curve during charge-discharge cycles. A LiMnTi-containing oxide with too high a content of a layered rock salt type structure may be more likely to provide a charge-discharge curve with an inflection point during charge-discharge cycles. A LiMnTi-containing oxide with too high a content of a spinel type structure may cause a decrease in charge-discharge capacity in a practical voltage range (high voltage range). A LiMnTi-containing oxide with too high a content of a tunnel structure may have a low lithium content and may cause a decrease in discharge capacity. In an embodiment of the present invention, therefore, a/(a+b) is set within the range shown above. The a/(a+b) ratio preferably satisfies the formula $0.78 \leq a/(a+b) \leq 0.86$.

The LiMnTi-containing oxide has a lattice constant in the range of 4.10 to 4.14 Å. This lattice constant corresponds to the lattice constant of a LiMnTi-containing oxide with a rock salt type structure. The LiMnTi-containing oxide with lithium, manganese, and titanium contents, a/(a+b), and a lattice constant falling within the ranges specified above can have a more stable rock salt type structure and can provide a charge-discharge curve with improved shape stability during charge-discharge cycles.

The secondary battery positive electrode active material of this embodiment may be produced by a method including: producing a precursor of a LiMnTi-containing oxide; and producing the secondary battery positive electrode active material from the precursor. The precursor is a NaMnTi-containing oxide containing sodium, manganese, and titanium. The method for producing the secondary battery positive electrode active material of this embodiment will be described with reference to FIG. 1.

As shown in FIG. 1, the step of producing a NaMnTi-containing oxide (precursor) includes a mixing step S1 and a firing step S2. The mixing step S1 includes mixing a sodium source, a manganese source, and a titanium source to form a raw material mixture. The sodium, manganese, and titanium sources may be any suitable type, examples of which include oxides, carbonates, hydroxides, chlorides, and various other compounds. In an embodiment of the present invention, the sodium, manganese, and titanium sources are $Na_2CO_3$, $Mn_2O_3$, and $TiO_2$, respectively.

The sodium, manganese, and titanium sources may be mixed, for example, in such a ratio that the resulting mixture contains 0.40 to 0.60 moles of sodium and 0.20 to 0.50 moles of titanium based on the total molar amount of manganese and titanium normalized to 1 mole. The sodium, manganese, and titanium sources may be mixed by any suitable method, which may be a dry process or a wet process.

The firing step S2 includes firing the raw material mixture, which results from the mixing step S1, to form a NaMnTi-containing oxide. The raw material mixture may be fired, for example, in the atmosphere under conditions at a firing temperature of 900 to 1,200° C. The firing time is, for example, in the range of 1 to 30 hours while it depends on the composition of the raw material mixture, the firing temperature, and other conditions.

The NaMnTi-containing oxide produced as described above may have a tunnel structure.

As shown in FIG. 1, the secondary battery positive electrode active material may be produced from the NaMnTi-containing oxide by a process including a mixing step S3, a hydrothermal synthesis step S4, a water washing step S5, a drying step S6, and a griding step S7. The mixing step S3 includes mixing the NaMnTi-containing oxide, a lithium source, and water to form a dispersion containing the NaMnTi-containing oxide dispersed in a lithium aqueous solution. The lithium source may be any suitable type, examples of which include oxides, carbonates, hydroxides, chlorides, and various other compounds. In an embodiment of the present invention, the lithium source is $LiOH \cdot H_2O$. The content of lithium in the dispersion is, for example, in the range of 2.0 to 30.0 moles based on the total molar amount of manganese and titanium, which is normalized to 1 mole, in the NaMnTi-containing oxide in the dispersion.

The hydrothermal synthesis step S4 includes subjecting the NaMnTi-containing oxide in the dispersion, which results from the mixing step S3, to hydrothermal treatment to hydrothermally synthesize a LiMnTi-containing oxide. The hydrothermal treatment in the lithium aqueous solution replaces sodium in the NaMnTi-containing oxide with lithium and converts the crystal structure of the NaMnTi-containing oxide to a LiMnTi-containing oxide with a rock salt type structure. For example, the hydrothermal treatment may include placing the dispersion in a sealed vessel and heating the sealed vessel at a temperature of 150 to 230° C. in the air. The hydrothermal treatment may be performed, for example, for a time period in the range of 1 to 30 hours, while the treatment time depends on the content of the NaMnTi-containing oxide and the lithium source in the dispersion, the volume of the sealed vessel, and other conditions.

The water washing step S5 includes collecting the LiMnTi-containing oxide resulting from the hydrothermal synthesis step S4 and washing the LiMnTi-containing oxide with water. The washing of the LiMnTi-containing oxide with water removes sodium, which results from the replacement with lithium, and the unreacted fraction of the lithium source.

The drying step S6 includes drying the LiMnTi-containing oxide, which has been washed with water in the water washing step S5. The drying may be performed by any suitable method, examples of which include various methods used for drying inorganic materials, such as heat drying, vacuum drying, and spray drying.

The griding step S7 includes grinding the LiMnTi-containing oxide product, which has been dried in the drying step S6, into particles with sizes that allow them to be used as a secondary battery positive electrode active material. The grinding may be performed by any suitable method using any of various grinders for grinding inorganic materials, such as a ball mill, a bead mill, a jet mill, or a mortar and a pestle.

The secondary battery positive electrode active material of this embodiment may be a lithium secondary battery positive electrode active material. The lithium secondary battery includes, for example, a positive electrode, a negative electrode, an electrolytic solution, a separator provided between the positive and negative electrodes, and an outer case that houses them. A solid electrolyte may be used instead of the electrolytic solution.

The positive electrode includes a positive electrode current collector and a positive electrode active material layer provided on the surface of the positive electrode current collector. The positive electrode active material layer includes the secondary battery positive electrode active material of this embodiment. The positive electrode active material layer may contain a conducting aid and a binder. The secondary battery positive electrode active material of this embodiment is chemically stable. Thus, the conducting aid and the binder may be any type, such as those known to be used for positive electrode active material layers for lithium secondary batteries. The positive electrode current collector may also be any type, such as an aluminum foil or any other material known to be used as a positive electrode current collector for lithium secondary batteries.

The negative electrode may be a multilayer member including a negative electrode current collector and a negative electrode active material layer provided on the surface of the negative electrode current collector. The negative electrode active material layer includes a negative electrode active material. The negative electrode active material may be a material capable of storing and releasing metallic lithium or lithium or may be a metal or semimetal capable of forming an alloy with lithium. Examples of the material capable of storing and releasing lithium include lithium transition metal oxides, such as lithium titanate, transition metal oxides, such as $TiO_2$, $Nb_2O_3$, and $WO_3$, Sio, metal sulfides, metal nitrides, and carbon materials, such as artificial graphite, natural graphite, graphite, soft carbon, and hard carbon. Examples of the metal or semimetal capable of forming an alloy with lithium include Mg, Si, Au, Ag, In, Ge, Sn, Pb, Al, and Zn. The negative electrode active material may be a powdery material. In such a case, the negative electrode active material layer may contain a conducting aid and a binder. The conducting aid and the binder may be any type, such as those known to be used for negative electrode active material layers for lithium secondary batteries. The negative electrode current collector may be any type, such as a copper foil or any other material known to be used as a negative electrode current collector for lithium secondary batteries.

The electrolytic solution includes an organic solvent and an electrolyte. Examples of the organic solvent include cyclic carbonates, chain carbonates, cyclic ethers, chain ethers, hydrofluoroethers, aromatic ethers, sulfones, cyclic esters, chain carboxylic esters, and nitriles. Examples of cyclic carbonates include ethylene carbonate, propylene carbonate, vinylene carbonate, and fluoroethylene carbonate. Examples of chain carbonates include dimethyl carbonate, diethyl carbonate, and ethyl methyl carbonate. Examples of cyclic ethers include tetrahydrofuran, 2-methyltetrahydrofuran, tetrahydropyran, 1,3-dioxolane, and 4-methyl-1,3-dioxolane. Examples of chain ethers include 1,2-dimethoxyethane, 1,2-diethoxyethane, ethoxymethoxyethane, and diethyl ether. Examples of hydrofluoroethers include 1,1,2,2-tetrafluoroethyl-2,2,2-trifluoroethyl ether, 1,1,2,2-tetrafluoroethyl-2,2,3,3-tetrafluoropropyl ether, bis (2,2,2-trifluoroethyl) ether, and 1,2-bis(1,1,2,2-tetrafluoroethoxy) ethane. Examples of aromatic ethers include anisole. Examples of sulfones include sulfolane and methylsulfolane. Examples of cyclic esters include γ-butyrolactone. Examples of chain carboxylic esters include acetic acid esters, butyric acid esters, and propionic acid esters. Examples of nitriles include acetonitrile and propionitrile. One of these organic solvents may be used, or a combination of two or more of these organic solvents may be used.

The electrolyte is a source of lithium ions, which act as a charge transfer medium, and includes a lithium salt. Examples of the lithium salt include $LiPF_6$, $LiBF_4$, $LiClO_4$, $LiAsF_6$, $LiCF_3SO_3$, $LiC(CF_3SO_2)_3$, $LiN(CF_3SO_2)_2$ (LiTFSI), $LiN(FSO_2)_2$(LiFSI), and $LiBC_4O_8$. One of these lithium salts may be used, or a combination of two or more of these lithium salts may be used.

The solid electrolyte may be, for example, a sulfide solid electrolyte, an oxide solid electrolyte, a nitride solid electrolyte, or a halide solid electrolyte. Examples of the sulfide solid electrolyte include $Li_2S—P_2S_5$ and $Li_2S—P_2S_5—LiI$. Examples of the oxide solid electrolyte include NASICON type oxides, garnet type oxides, and perovskite type oxides. Examples of NASICON type oxides include oxides including Li, Al, Ti, P, and O (e.g., $Li_{1.5}Al_{0.5}Ti_{1.5}(PO_4)_3$). Examples of garnet type oxides include oxides including Li, La, Zr, and O (e.g., $Li_7La_3Zr_2O_{12}$). Examples of perovskite type oxides include oxides including Li, La, Ti, and O (e.g., $LiLaTiO_3$).

The separator may be any suitable type, such as a porous sheet or a nonwoven fabric sheet. Examples of the material for the porous sheet include polyolefins, such as polyethylene and polypropylene, aramid, polyimide, and fluororesin. Examples of the material for the nonwoven fabric sheet include glass fibers and cellulose fibers.

The outer case may be any type, such as a metal case, a laminate film case, or any other material known to be used as an outer case for lithium secondary batteries.

The secondary battery positive electrode active material of this embodiment having the features described above with lithium, manganese, and titanium contents, a/(a+b), and a lattice constant falling within the specified ranges provides improved charge-discharge capacity, improved charge-discharge efficiency, and improved stability of charge-discharge curve shape during charge-discharge cycles with a good balance between them.

The method for producing the secondary battery positive electrode active material of this embodiment, which includes hydrothermally treating a NaMnTi-containing oxide in a lithium aqueous solution, is advantageous in the industrial production of the secondary battery positive electrode active material.

EXAMPLES

Example 1

(Preparation of NaMnTi-Containing Oxide Powder)

$Na_2CO_3$, $Mn_2O_3$, and $TiO_2$ were weighed in a total amount of 1.0 g such that when the total molar amount of Mn and Ti was normalized to 1 mole, the normalized amount of Na (Na/(Mn+Ti)) and the normalized amount of Ti (Ti/(Mn+Ti)) were 0.5 moles and 0.22 moles, respectively. The weighed $Na_2CO_3$, $Mn_2O_3$, and $TiO_2$ were mixed using a mortar and a pestle. The resulting raw material mixture was placed in an alumina crucible and fired in the atmosphere under conditions at a firing temperature of 1,000° C. for 12 hours. The resulting fired product was ground using a mortar and a pestle. The X-ray diffraction pattern of the resulting fired product powder was measured to show that the powder was a NaMnTi oxide powder having a tunnel structure.

(Preparation of LiMnTi-Containing Oxide Powder)

To a hydrothermal reaction vessel were added 2.00 g of $LiOH·H_2O$ and 50 mL of water and stirred to form a solution of $LiOH·H_2O$ (LiOH solution). Next, 0.5 g of the NaMnTi oxide powder obtained as described above was added to the LiOH solution and stirred to form a dispersion of the NaMnTi oxide powder in the LiOH solution. Next, the hydrothermal reaction vessel was sealed and then placed in a thermostatic chamber and heated under the conditions of a heating temperature of 180° C. and a heating time of 24 hours, during which the NaMnTi oxide powder was hydrothermally treated. After the heating, the hydrothermally treated powder (LiMnTi-containing oxide powder) was collected from the hydrothermal reaction vessel. The collected LiMnTi-containing oxide powder was washed with water and then centrifuged three times for removal of water. The dewatered LiMnTi-containing oxide powder was placed on a Petri dish and vacuum-dried under conditions at a temperature of 100° C. for 6 hours. After being dried, the LiMnTi-containing oxide powder was ground using a mortar and a pestle.

Example 2

A LiMnTi-containing oxide powder was prepared in the same way as in Example 1, except that $Na_2CO_3$, $Mn_2O_3$, and $TiO_2$ were weighed such that when the total molar amount of Mn and Ti was normalized to 1 mole, the normalized amount of Ti was 0.33 moles for the preparation of the NaMnTi-containing oxide powder.

Example 3

A LiMnTi-containing oxide powder was prepared in the same way as in Example 1, except that $Na_2CO_3$, $Mn_2O_3$, and $TiO_2$ were weighed such that when the total molar amount of Mn and Ti was normalized to 1 mole, the normalized amount of Ti was 0.44 moles for the preparation of the NaMnTi-containing oxide powder.

Example 4

A Li—Mn—Ti oxide powder was prepared in the same way as in Example 1, except that $Na_2CO_3$, $Mn_2O_3$, and $TiO_2$ were weighed such that when the total molar amount of Mn and Ti was normalized to 1 mole, the normalized amount of Ti was 0.50 moles for the preparation of the NaMnTi-containing oxide powder.

Comparative Example 1

A LiMn-containing oxide powder was prepared in the same way as in Example 1, except that $TiO_2$ was not used and $Na_2CO_3$ and $Mn_2O_3$ were weighed in a total amount of 1.0 g such that Na and Mn were in a molar ratio of 0.5:1 for the preparation of a NaMnTi-containing oxide powder.

Comparative Example 2

A LiMnTi-containing oxide powder was prepared in the same way as in Example 1, except that $Na_2CO_3$, $Mn_2O_3$, and $TiO_2$ were weighed such that when the total molar amount of Mn and Ti was normalized to 1 mole, the normalized amount of Ti was 0.11 moles for the preparation of the NaMnTi-containing oxide powder.

[Evaluation]

The LiMnTi-containing oxide powders and the LiMn-containing oxide powder obtained in Examples 1 to 4 and Comparative Examples 1 and 2 were evaluated for chemical composition, X-ray diffraction pattern, lattice constant, charge-discharge characteristics, and charge-discharge curve shape stability by the methods described below.

(Chemical Composition)

The powder sample was dissolved in acid. The contents of lithium, manganese, and titanium in the resulting solution were measured using an induced coupled plasma (ICP) emission spectrometer. The measured lithium, manganese, and titanium contents were used to calculate the lithium, manganese, and titanium contents based on their total content normalized to 100 mol % and to calculate the molar amounts of lithium, manganese, and titanium based on the total molar amount of manganese and titanium normalized to 1 mole. The results are shown in Table 1 below.

(X-ray Diffraction Pattern)

Figure 2:
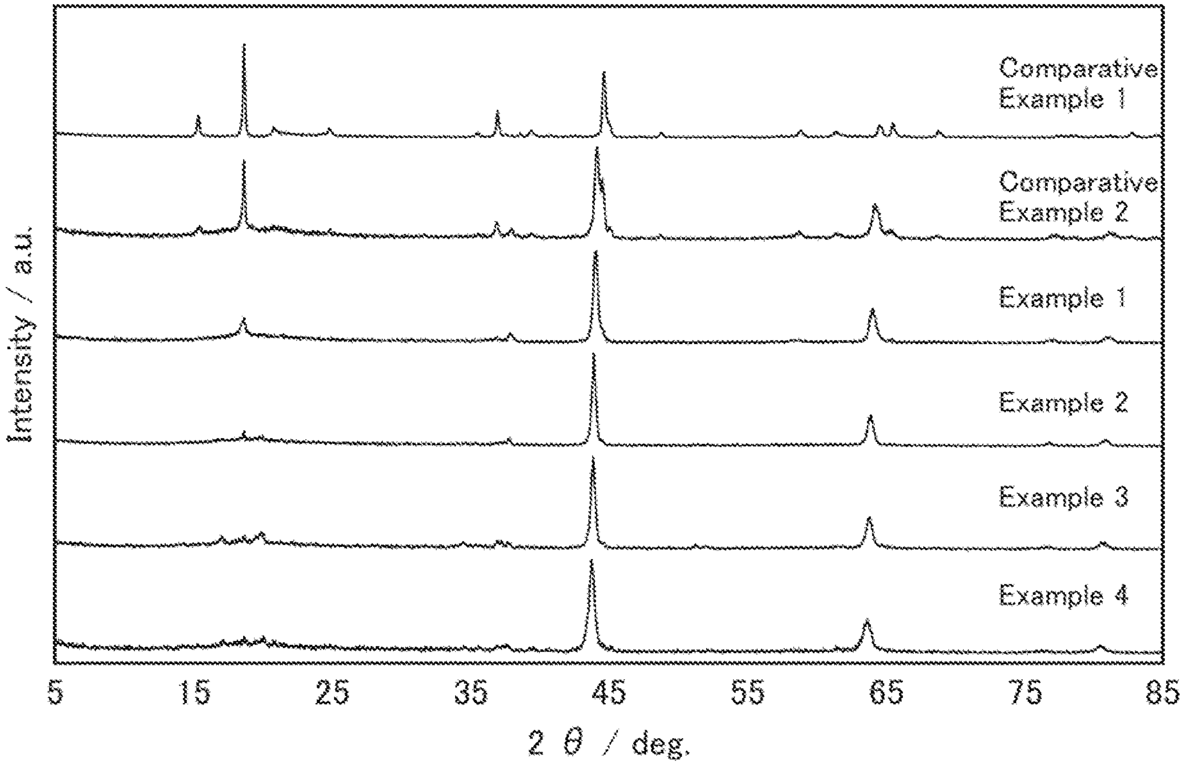
FIG. 2 is a graph showing X-ray diffraction patterns of LiMnTi-containing oxide powders and LiMn-containing oxide powder obtained in Examples 1 to 4 and Comparative Examples 1 and 2.
Figure 3:
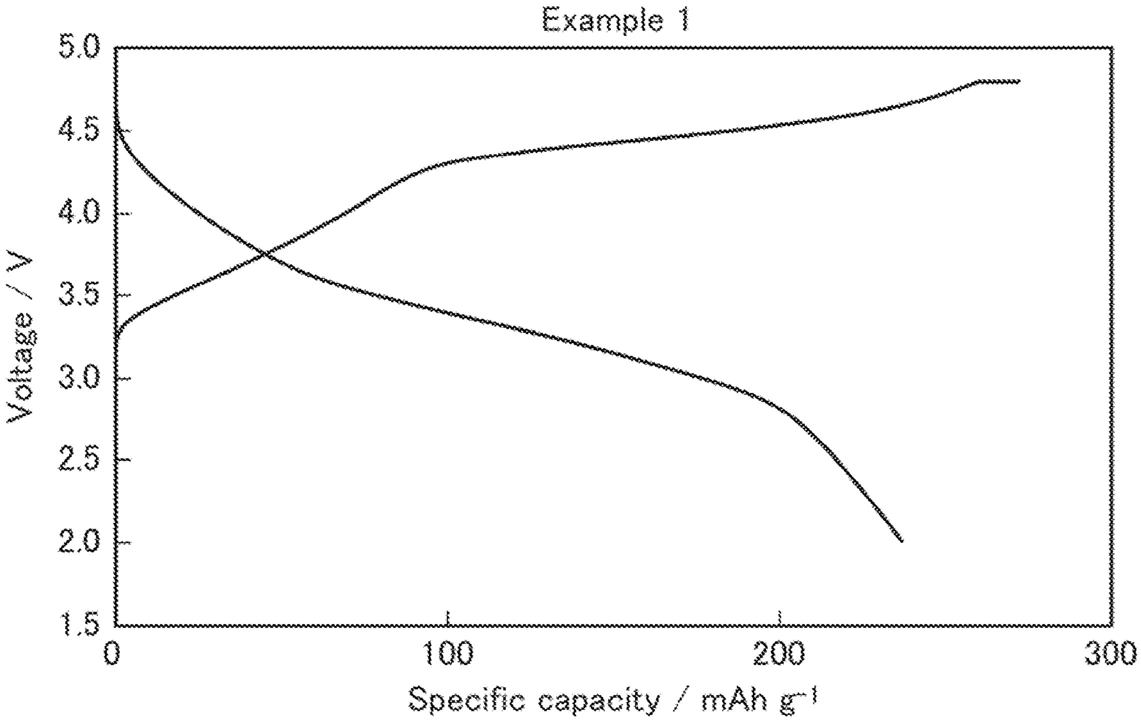
FIG. 3 is a graph showing the first charge-discharge curve of a two-electrode cell containing LiMnTi-containing oxide powder obtained in Example 1.
Figure 4:
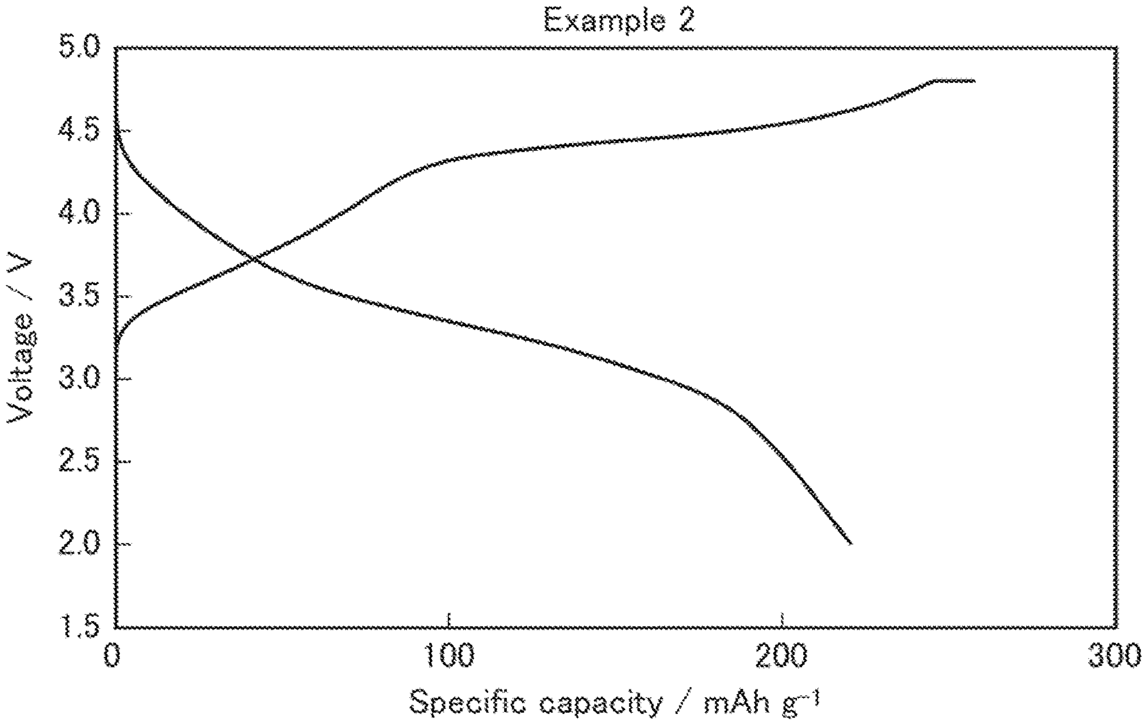
FIG. 4 is a graph showing the first charge-discharge curve of a two-electrode cell containing LiMnTi-containing oxide powder obtained in Example 2.
Figure 5:
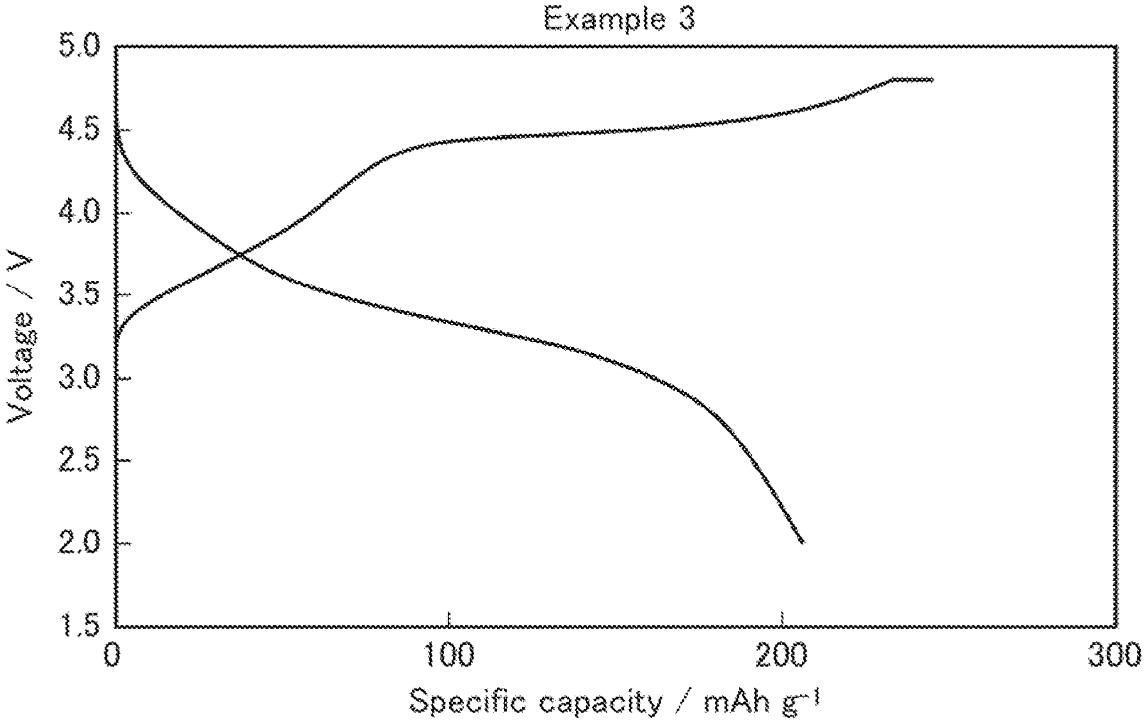
FIG. 5 is a graph showing the first charge-discharge curve of a two-electrode cell containing LiMnTi-containing oxide powder obtained in Example 3.
Figure 6:
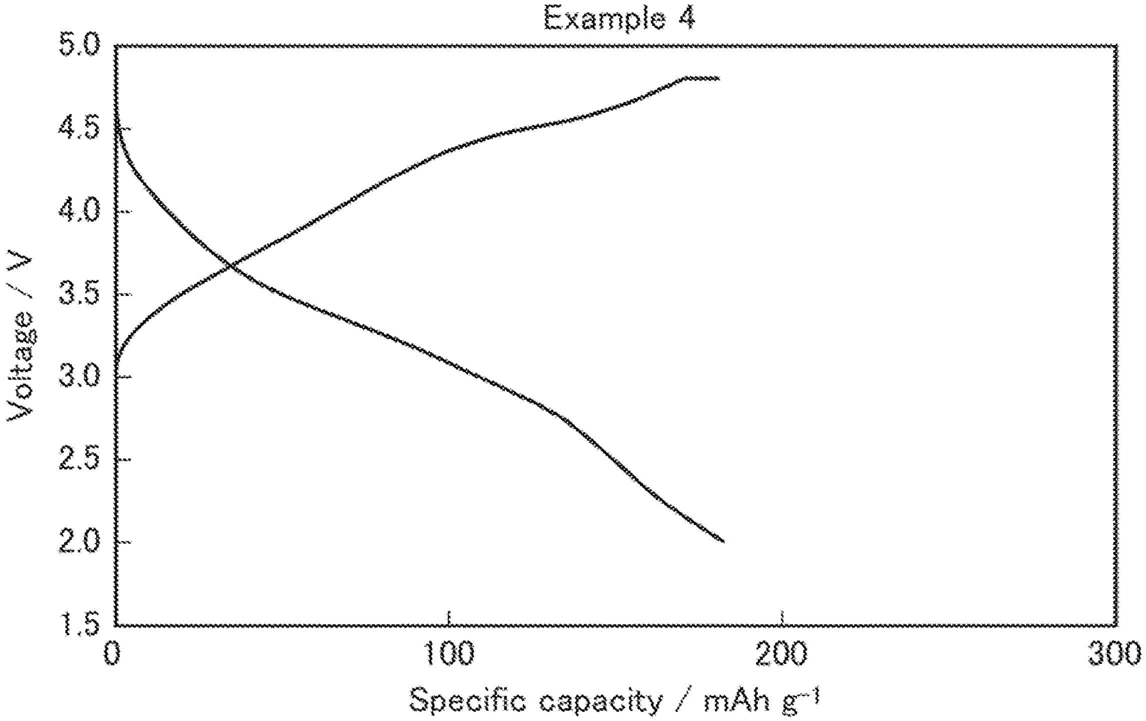
FIG. 6 is a graph showing the first charge-discharge curve of a two-electrode cell containing LiMnTi-containing oxide powder obtained in Example 4.
Figure 7:
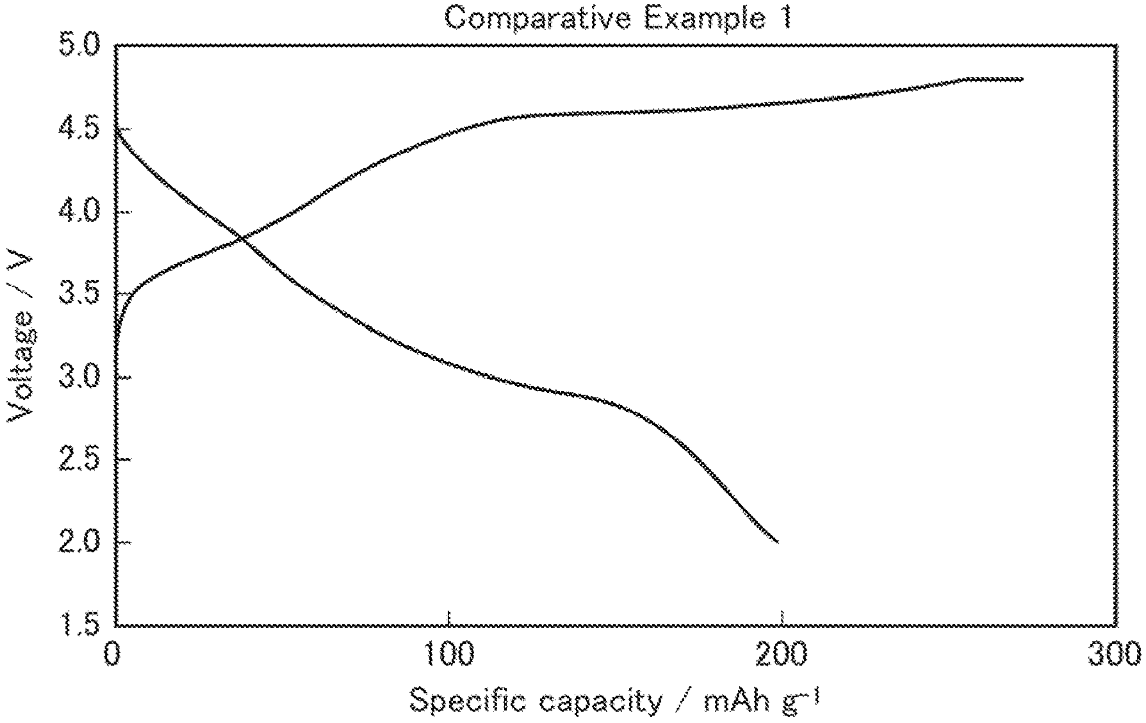
FIG. 7 is a graph showing the first charge-discharge curve of a two-electrode cell containing LiMn-containing oxide powder obtained in Comparative Example 1.
Figure 8:
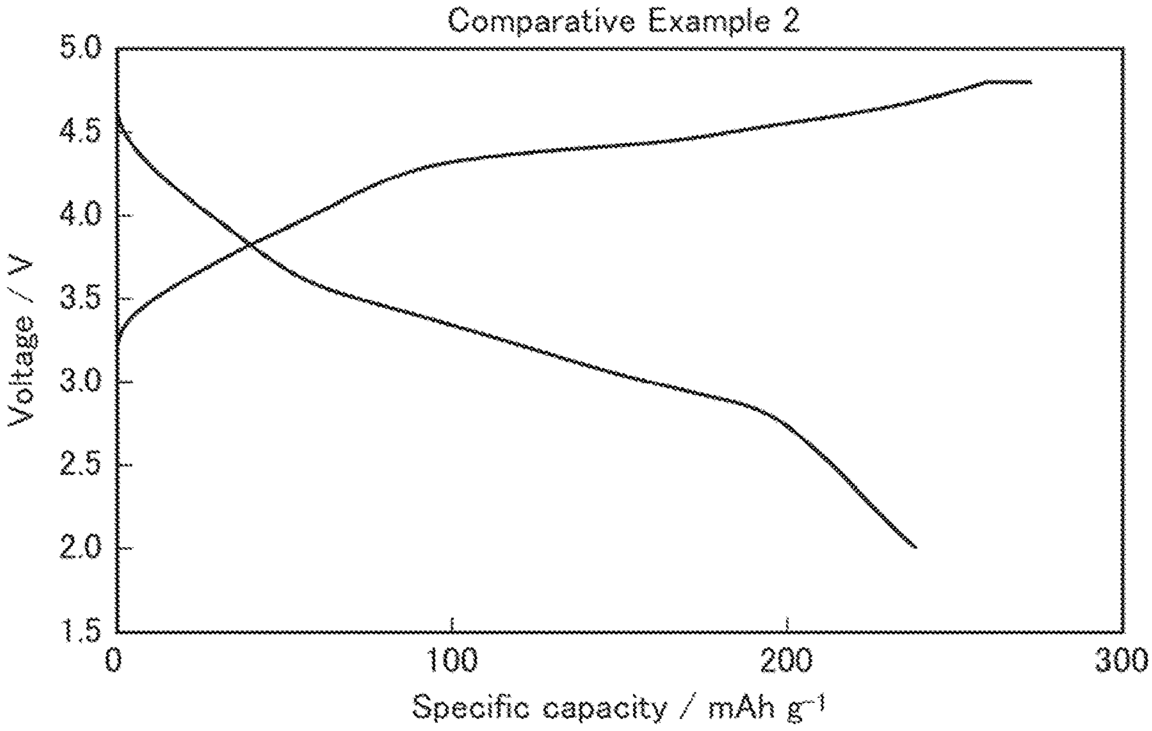
FIG. 8 is a graph showing the first charge-discharge curve of a two-electrode cell containing LiMnTi-containing oxide powder obtained in Comparative Example 2.

The X-ray diffraction pattern of the powder sample was measured under the conditions shown below. The resulting X-ray diffraction patterns are shown in FIG. 2. It was determined from the X-ray diffraction pattern what angle the maximum X-ray diffraction peak was at. In this regard, it was not determined what angle the maximum X-ray diffraction peak of the LiMn-containing oxide powder obtained in Comparative Example 1 was at because the maximum X-ray diffraction peak was out of the 2θ angle range of 43 to 45 degrees. The intensity a of the maximum X-ray diffraction peak in the 2θ range of 43 to 45 degrees and the intensity b of the maximum peak among the X-ray diffraction peaks in the 2θ range of 15 to 22 degrees were determined from the X-ray diffraction pattern and used to calculate a/(a+b). The results are shown in Table 2.

Measurement system: RINT-2550V manufactured by Rigaku Corporation

X-ray source: CuKα

X-ray power: 40 kV, 200 mA

Measurement conditions: 1.0 s, 0.03 degree interval (Lattice Constant)

The lattice constant of the powder sample was calculated by the least square method using the respective X-ray diffraction peak indices derived from the rock salt type structure determined from the X-ray diffraction pattern, which was measured under the conditions shown above, and using plane spacings thereof. The results are shown in Table 2.

(Charge-Discharge Characteristics)

A mixture of 5 mg of the powder sample, 5 mg of acetylene black (conducting material), and 1 mg of PTFE (binder) was prepared. The resulting mixture was formed into a sheet, which was then pressure-bonded onto an Al mesh to form a working electrode. A metallic lithium foil was used as the counter electrode. $LiPF_6$ was dissolved in a mixed solvent of EC and DMC to form an electrolytic solution. The working electrode and the counter electrode were immersed in the electrolytic solution to form a two-electrode cell.

The two-electrode cell was subjected to a charge-discharge test. The charge-discharge test was performed under the conditions: current density 10 mA/g (per sample); voltage range 2.0 to 4.8 V; and constant current-constant voltage charging (until 2 hours elapsed). The charge-discharge test was performed in the environment at 25° C. The charge-discharge test included 7 cycles, during which the voltage was in the range of 2.0 to 4.3 V at the second and subsequent cycles. The first (first cycle) charge-discharge curves are shown in FIGS. 3 to 8, and the first charge capacity, the first discharge capacity, and the first charge-discharge efficiency ((first discharge capacity/first charge capacity)×100) are shown in Table 3.

(Stability of Charge-Discharge Curve Shape)

Figure 9:
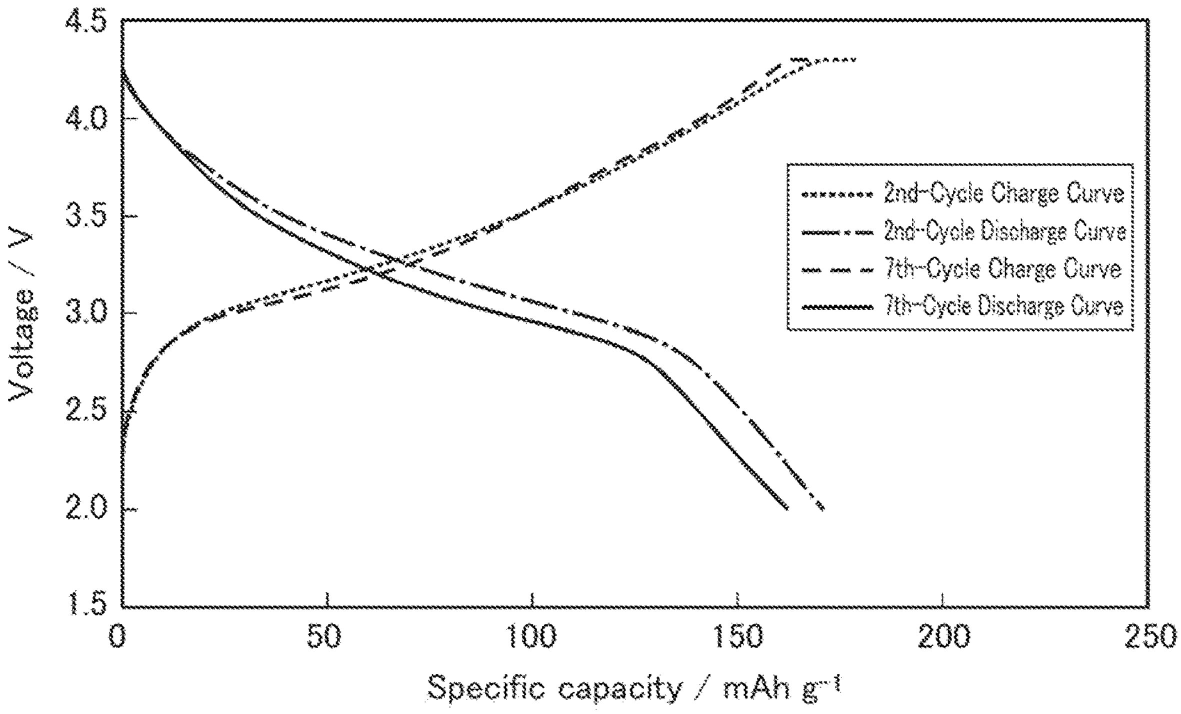
FIG. 9 is a graph showing the second-cycle and seventh-cycle charge discharge curves of a two-electrode cell containing LiMnTi-containing oxide powder obtained in Example 1.
Figure 10:
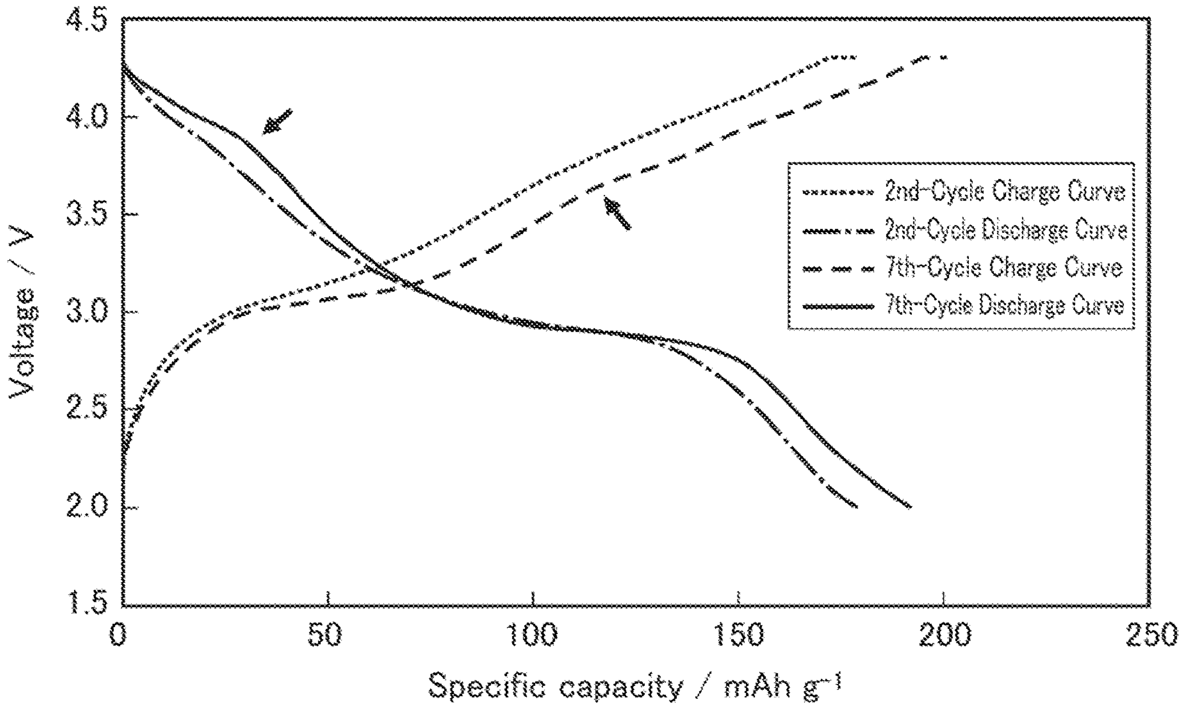
FIG. 10 is a graph showing the second-cycle and seventh-cycle charge-discharge curves of a two-electrode cell containing LiMn-containing oxide powder obtained in Comparative Example 1.
Figure 11:
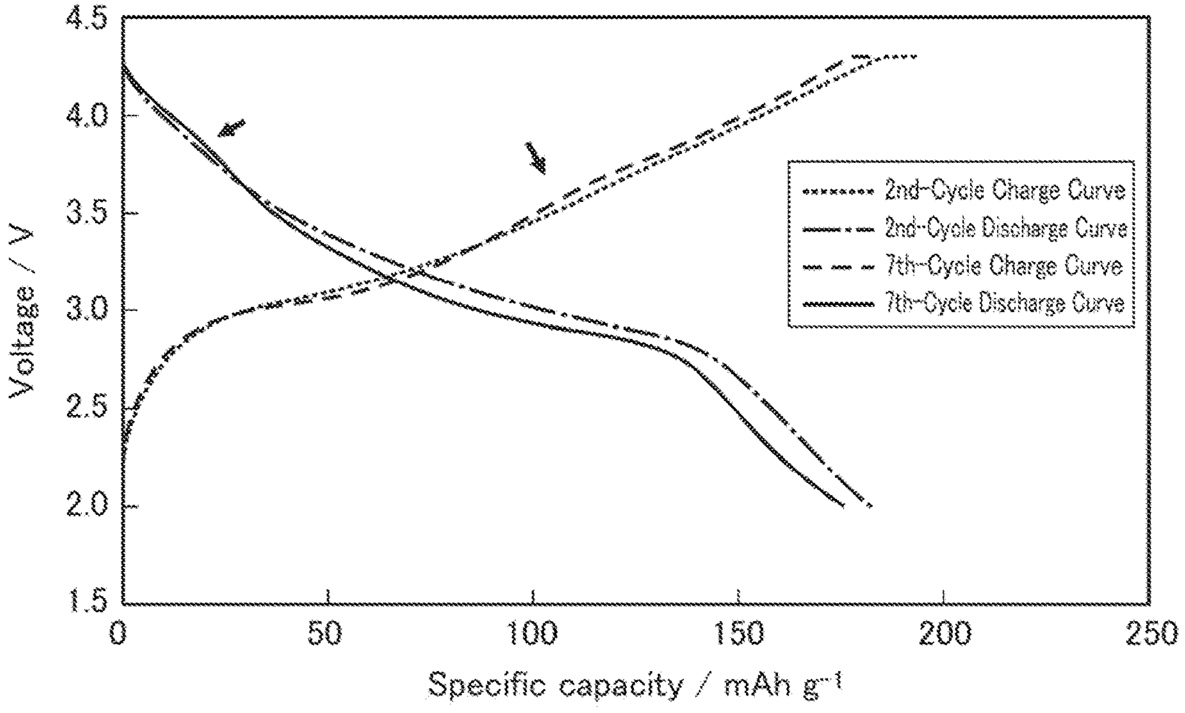
FIG. 11 is a graph showing the second-cycle and seventh-cycle charge-discharge curves of a two-electrode cell containing LiMnTi-containing oxide powder obtained in Comparative Example 2.

A comparison between the second-cycle and seventh-cycle charge-discharge curves obtained in the evaluation of the charge-discharge characteristics was made to determine whether a new inflection point occurred in the seventh-cycle charge and discharge curves for the evaluation of the stability of charge-discharge curve shape. No occurrence of any new inflection point is expressed as "absent" (no change in shape), while occurrence of a new inflection point is expressed as "present" (a change in shape). The results are shown in Table 3. FIG. 9 shows the second-cycle and seventh-cycle charge-discharge curves of the two-electrode cell containing the LiMnTi-containing oxide powder obtained in Example 1. FIG. 10 shows the second-cycle and seventh-cycle charge-discharge curves of the two-electrode cell containing the LiMn-containing oxide powder obtained in Comparative Example 1. FIG. 11 shows the second-cycle and seventh-cycle charge-discharge curves of the two-electrode cell containing the LiMnTi-containing oxide powder obtained in Comparative Example 2.

TABLE 1

| | Chemical composition | | | | | |
|---|---|---|---|---|---|---|
| | Mol % | | | Moles | | |
| | Li | Mn | Ti | Li | Mn | Ti |
| Example 1 | 57.00 | 33.00 | 9.00 | 1.35 | 0.78 | 0.22 |
| Example 2 | 57.00 | 29.00 | 14.00 | 1.31 | 0.67 | 0.33 |
| Example 3 | 58.00 | 24.00 | 19.00 | 1.37 | 0.56 | 0.44 |
| Example 4 | 45.00 | 28.00 | 27.00 | 0.83 | 0.51 | 0.49 |
| Comparative Example 1 | Not measured | | | | | |
| Comparative Example 2 | 59.00 | 37.00 | 5.00 | 1.41 | 0.89 | 0.11 |

TABLE 2

| | X-ray diffraction pattern | | | | |
|---|---|---|---|---|---|
| | Maximum X-ray diffraction peak angle (deg) | Peak intensity a | Peak intensity b | $\frac{a}{(a+b)}$ | Lattice constant (Å) |
| Example 1 | 44.09 | 1031 | 292 | 0.78 | 4.108 |
| Example 2 | 43.94 | 1250 | 203 | 0.86 | 4.120 |
| Example 3 | 43.88 | 1001 | 196 | 0.84 | 4.127 |
| Example 4 | 43.79 | 680 | 135 | 0.83 | 4.136 |
| Comparative Example 1 | Not measured | 1174 | 1671 | 0.41 | Not measured |
| Comparative Example 2 | 44.18 | 704 | 614 | 0.53 | 4.086 |

TABLE 3

| | Charge-discharge characteristics | | | |
|---|---|---|---|---|
| | First charge capacity (mAh/g) | First discharge capacity (mAh/g) | First charge-discharge efficiency (%) | Change in charge-discharge curve shape during cycle |
| Example 1 | 272 | 237 | 87 | Absent |
| Example 2 | 258 | 221 | 86 | Absent |
| Example 3 | 245 | 206 | 84 | Absent |
| Example 4 | 181 | 183 | 101 | Absent |
| Comparative Example 1 | 272 | 199 | 73 | Present |
| Comparative Example 2 | 273 | 239 | 88 | Present |

The results shown in Tables 1 to 3 and FIGS. 2, 3 to 6, and 9 indicate that the LiMnTi-containing oxide powders of Examples 1 to 4, which have lithium, manganese, titanium contents, a/(a+b), and a lattice constant falling within the ranges according to the present invention, provide improved charge-discharge capacity, improved charge-discharge efficiency, and improved stability of charge-discharge curve shape during charge-discharge cycles with a good balance between them and are useful as positive electrode active materials for secondary batteries. On the other hand, the LiMn-containing oxide powder of Comparative Example 1, which contains no titanium, exhibited a lower first charge-discharge efficiency. As shown in FIG. 10, the LiMn-containing oxide powder of Comparative Example 1 also provided a seventh-cycle charge-discharge curve with an inflection point. As shown in FIG. 11, the LiMnTi-containing oxide powder of Comparative Example 2, in which the titanium content and a/(a+b) are out of the ranges according to the present invention, provided a seventh-cycle charge-discharge curve with an inflection point.

What is claimed is:

1. A secondary battery positive electrode active material comprising an oxide containing lithium, manganese, and titanium, the oxide having a lithium content in a range of 43 to 60 mol %, a manganese content in a range of 22 to 35 mol %, and a titanium content in a range of 7 to 29 mol % based on the total content of lithium, manganese, and titanium normalized to 100 mol %, the oxide having an X-ray diffraction pattern that is measured using CuKα as an X-ray source and has a maximum X-ray diffraction peak exhibiting a highest peak intensity in a 2θ range of 5 to 90 degrees and existing at an angle in a range of 43 to 45 degrees, the oxide satisfying the formula $0.70<a/(a+b)<0.90$, wherein a is the intensity of the maximum X-ray diffraction peak and b is the intensity of a maximum peak among X-ray diffraction peaks in a 2θ range of 15 to 22 degrees, the oxide having a lattice constant in a range of 4.10 to 4.14 Å.

2. The secondary battery positive electrode active material according to claim 1, wherein the oxide has a lithium content in a range of 45 to 58 mol %, a manganese content in a range of 24 to 33 mol %, a titanium content in a range of 9 to 27 mol %, and the a/(a+b) satisfies the formula:

$$0.78 \le a/(a+b) \le 0.86.$$

3. A method for producing the secondary battery positive electrode active material according to claim 1, the method comprising: subjecting a NaMnTi-containing oxide containing sodium, manganese, and titanium to hydrothermal treatment in a lithium aqueous solution.

4. The method according to claim 3, wherein the NaMnTi-containing oxide has a sodium content in a range of 0.40 to 0.60 moles and a titanium content in a range of 0.20 to 0.50 moles based on the total molar amount of the manganese and the titanium normalized to 1 mole.

5. The method according to claim 3, wherein the NaMnTi-containing oxide has a tunnel structure.

6. The method according to claim 3, wherein the lithium aqueous solution has a lithium content in a range of 2.0 to 30.0 moles based on the total molar amount of the manganese and the titanium normalized to 1 mole in the NaMnTi-containing oxide in the lithium aqueous solution.

* * * * *